P. A. MILLER.
WEATHER FRAME FOR WIND SHIELDS AND AUTOMOBILE BODIES.
APPLICATION FILED NOV. 5, 1917.

1,289,224.

Patented Dec. 31, 1918.
2 SHEETS—SHEET 1.

Witness
Chas. W. Stauffer
Karl H. Butler

Inventor
Peter A. Miller,

By
Attorney

P. A. MILLER.
WEATHER FRAME FOR WIND SHIELDS AND AUTOMOBILE BODIES.
APPLICATION FILED NOV. 5, 1917.
1,289,224.
Patented Dec. 31, 1918.
2 SHEETS—SHEET 2.
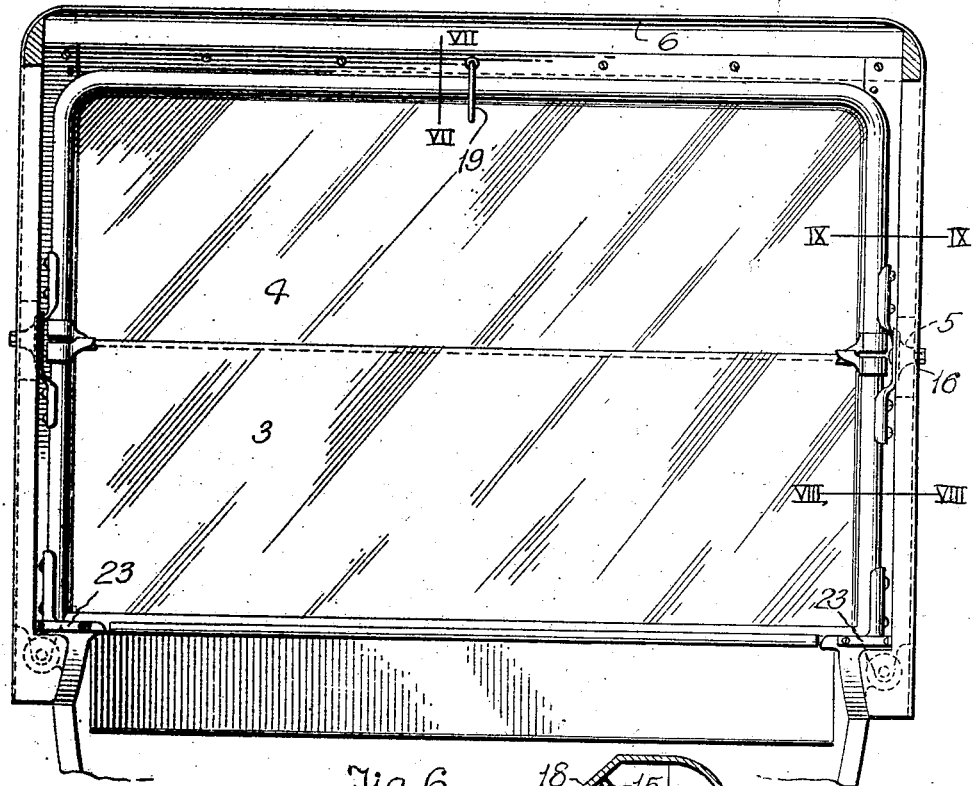
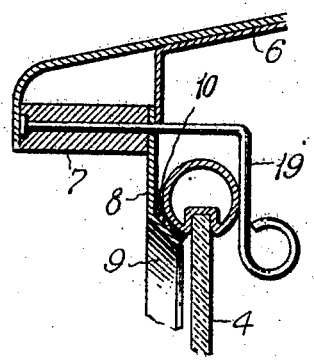
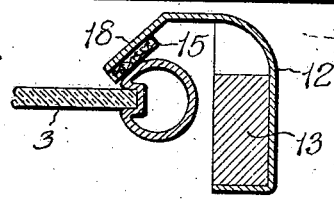
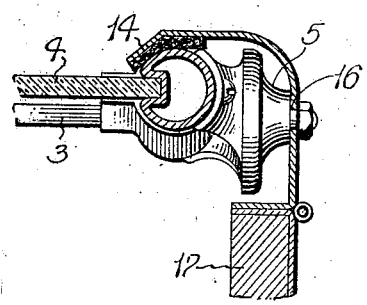
Inventor
Peter A. Miller,

UNITED STATES PATENT OFFICE.

PETER A. MILLER, OF CARO, MICHIGAN.

WEATHER-FRAME FOR WIND-SHIELDS AND AUTOMOBILE-BODIES.

1,289,224.  Specification of Letters Patent.  Patented Dec. 31, 1918.

Application filed November 5, 1917. Serial No. 200,255.

*To all whom it may concern:*

Be it known that I, PETER A. MILLER, a citizen of the United States of America, residing at Caro, in the county of Tuscol and State of Michigan, have invented certain new and useful Improvements in Weather-Frames for Wind-Shields and Automobile-Bodies, of which the following is a specification, reference being had therein to the accompanying drawings.

It is the present practice to furnish automobile bodies with detachable winter tops or inclosures which when installed imparting a limousine effect to automobile bodies particularly those bodies commonly used in connection with touring cars and ordinarily provided with foldable or collapsible canopy tops. The detachable winter tops are rigid in contradistinction to an ordinary summer top and are suitably fastened to an automobile body and provides sufficient clearance at the forward end of the body for the usual shield. Many such rigid tops do not snugly fit around the windshield, consequently there are air gaps through which air and the elements may pass with much discomfort to the occupants of the automobile body, it being practically impossible to maintain a comfortable temperature within the body particularly during inclement weather.

To render the connection between an automobile top and a windshield practically weatherproof is the principal object of my invention, which is attained by providing novel weather strips or frames that may be easily and quickly installed to close such spaces as ordinarily exist between the windshield and the forward end of a rigid automobile top or inclosure.

My invention will be hereinafter specifically described and then claimed, and reference will now be had to the drawings wherein—

Fig. 6 is an elevation of the inner side of a windshield, showing a top in cross section relatively thereto, and illustrating the manner of connecting the top to the windshield;

Fig. 7 is an enlarged cross sectional view taken on the line VII—VII of Fig. 6;

Fig. 8 is a horizontal sectional view taken on the line VIII—VIII of Fig. 6, and Fig. 9 is a similar view taken on the line IX—IX of Fig. 6.

Figure 1:
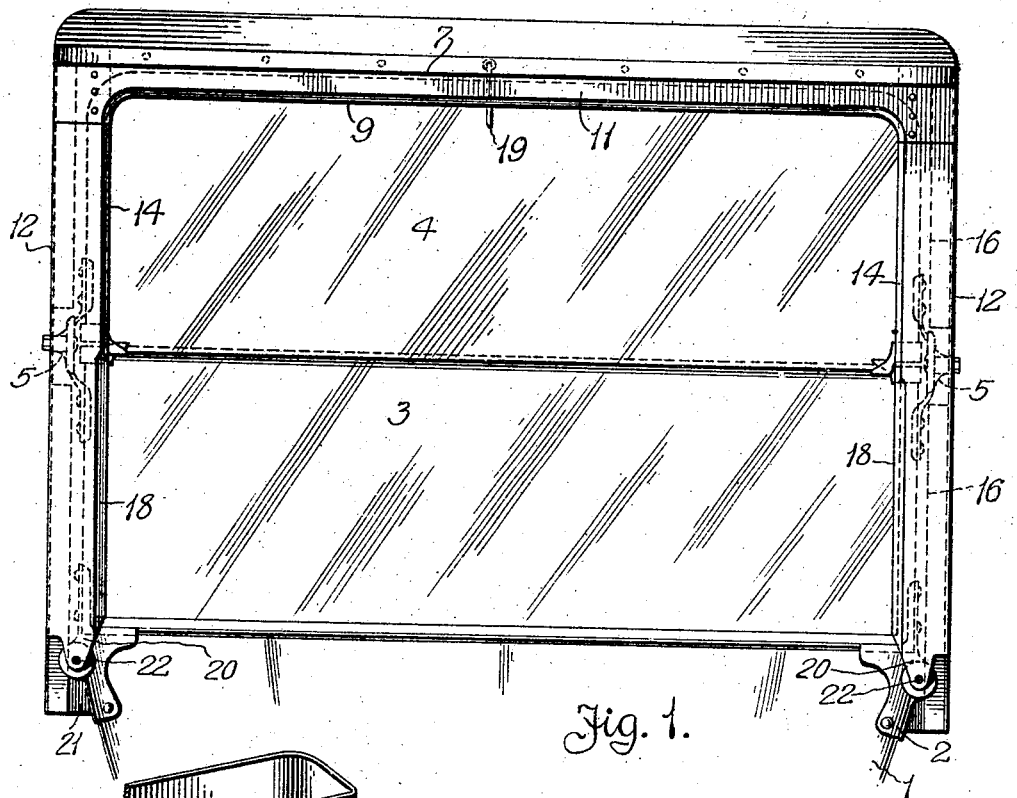
Figure 1 is a front elevation of an automobile top and windshield showing the weather frame or strip in position.
Figure 2:
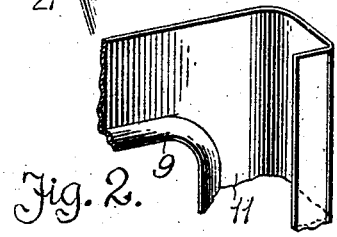
Fig. 2 is a perspective view of a portion of the weather strip or frame.

In the drawings, the reference numeral 1 denotes a portion of an automobile body and the dash of said body is provided with brackets 2 supporting the lower section 3 of a windshield, said lower section having an upper section 4 set relatively thereto and hingedly or pivotally connected to the lower section 3 by the usual form of hinge or pivotal connection 5.

6 denotes a rigid top or inclosure for the body 1 and suitably connected to the front rail 7 of the top is a top strip 8 having an inturned flange 9 provided with a lining 10 of felt or other yieldable material. The lining 10 is adapted to engage the upper rail of the windshield section 4 and the strip 8 has end portions 11 that may be separate from or form part of the upper ends of side strips 12. The side strips 12 are made of metal and are braced by wood inserts or bars 13, as best shown in Fig. 8. The top edges of the side strips 12 are rounded and terminate in inturned flanges 14 having linings 15 adapted to engage the side rails of both sections of the windshield and coöperate with the upper strip 8 in forming a frame around the edges of the entire windshield.

The side strips 12 are provided with openings 16 and said side strips may be connected to the hinges or pivotal connections 5 of the sections of the windshield, as shown in Fig. 9 of the drawing.

Figure 3:
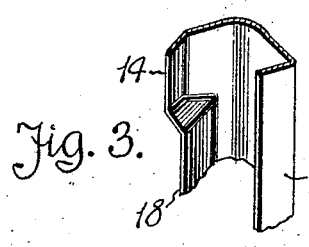
Fig. 3 is a perspective view of a portion of one of the side strips or rails of the frame.
Figure 4:
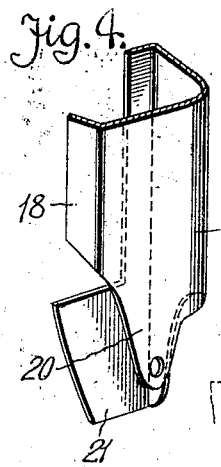
Fig. 4 is a perspective view of the lower end of the side strip or frame.
Figure 5:
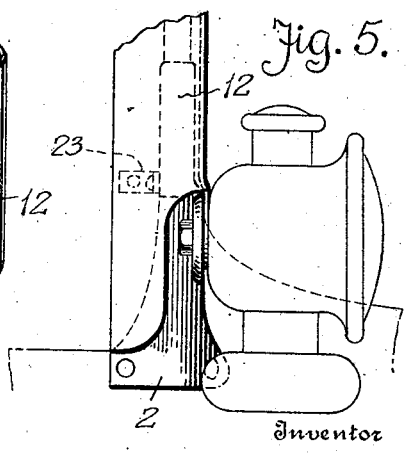
Fig. 5 is a side elevation of an ordinary lamp bracket showing the manner in which a side strip or frame is attached thereto.

The inner reinforced edges of the side strips 12 will afford supports for side doors 17 that may form part of the rigid top 6. Since the upper section 4 of the windshield is offset relatively to the section 3, the side strips 12 may have inset portions 18, as shown in Fig. 3, so that the flanges 14 and the linings 15 at the lower ends of the side strips may be in proximity to and snugly engage the side rails of the lower windshield section 3.

As the upper windshield section 4 may be tilted or adjusted inwardly, the top strip 8 or the upper ends of the side strips will not interfere with the adjustment of the top section 4 of the windshield, and to hold the top section of the windshield in engagement with the lining 10 of the top strip 8, a turn button or crank 19 may be employed, as best shown in Figs. 6 and 7. The turn crank is carried by the top 6 and it is only necessary to swing the same upwardly into a horizontal plane when it is desired to swing the upper section 4 of the windshield inwardly for ventilating purposes.

The side strips 12 have the lower ends thereof terminating in front apertured lugs 20 and rear inwardly projecting flanges 21. The front apertured lugs 20 are adapted to fit over the usual lamp bracket studs 22 and be held thereon by the same fastening means employed for holding lamps or lanterns in engagement with the brackets 2, while the flanges 21 are adapted to extend behind the brackets and against the automobile body 1, in order to close gaps that generally exist around the lantern brackets. These flanges are best shown in Fig. 6, and coöperate with the top and side strips in preventing air from entering an automobile top, between the edges of a windshield, and the top *per se*, consequently it is possible to maintain a comfortable temperature within an automobile body equipped with the weather frame or strips.

To further brace the lower ends of the frame or side strips relatively to the brackets 2 angle braces 23 are employed, these braces being connected to the inserts or bars 13 and to the brackets 2, as best shown in Fig. 6, thus firmly supporting and bracing the ends of the frame or strips relatively to the dash of the automobile body, while the upper strip or top frame is held by the forward end of the top 6.

The frame or strip may be readily made of sheet metal finished to harmonize with metallic fittings of the windshield or the automobile body, and with said frame or strips positively engaging the side and top rails of the windshield section, it is practically impossible for air to forcibly enter the automobile top or body from the forward end thereof.

It is thought that the utility of my invention will be apparent without further description, and while in the drawing there is illustrated a preferred embodiment of my invention, it is to be understood that the structural elements are susceptible to such variations and modifications as fall within the scope of the appended claim.

What I claim is:—

The combination with an automobile body having a top, brackets, and a sectional windshield supported by said brackets, of a weather frame connected to the forward end of said top and having side strips connected to said brackets, the side strips of said weather frame also being connected to the hinges of said wind-shield and provided with inturned flanges adapted to engage said automobile body, said frame and the side strips thereof having inturned flanges at the front and side rails of said windshield, and linings carried by the inturned flanges of said frame and the strips thereof adapted to engage the top and side rails of both sections of said windshield.

In testimony whereof I affix my signature in the presence of two witnesses:

PETER A. MILLER.

Witnesses:
L. G. SEELEY,
FRANK B. CAMPBELL.